United States Patent
Ghiran et al.

(10) Patent No.: US 8,592,733 B2
(45) Date of Patent: Nov. 26, 2013

(54) INDUCTION WELD ASSEMBLY OF CLOSURE PANELS

(75) Inventors: Mike M. Ghiran, Lake Orion, MI (US); Susan E. Hartfield-Wunsch, Livonia, MI (US); John E. Carsley, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 928 days.

(21) Appl. No.: 12/396,254

(22) Filed: Mar. 2, 2009

(65) Prior Publication Data

US 2010/0219178 A1 Sep. 2, 2010

(51) Int. Cl.
*B23K 13/01* (2006.01)

(52) U.S. Cl.
USPC ........... 219/617; 219/603; 219/633; 219/634; 219/635; 219/55; 219/57; 219/60.2; 219/61.2

(58) Field of Classification Search
CPC ....................................................... B23K 13/01
USPC .................. 219/617, 55, 57, 60.2, 61.2, 603; 219/633–635; 29/428; 156/379.6–379.9; 228/127
See application file for complete search history.

(56) References Cited

U.S. PATENT DOCUMENTS

| | | | | |
|---|---|---|---|---|
| 4,454,402 A | * | 6/1984 | Sander et al. | 219/633 |
| 5,403,986 A | * | 4/1995 | Goleby | 219/61.2 |
| 6,211,497 B1 | * | 4/2001 | Matsen et al. | 219/645 |
| 6,413,350 B1 | | 7/2002 | Boschi | |
| 6,867,386 B1 | * | 3/2005 | Niwa | 219/109 |
| 2005/0161965 A1 | * | 7/2005 | Eberlein | 296/29 |
| 2006/0255029 A1 | * | 11/2006 | Bone, Jr. | 219/672 |

FOREIGN PATENT DOCUMENTS

| | | | | |
|---|---|---|---|---|
| DE | 3510779 A | * | 9/1986 | |
| DE | 3923182 A | * | 1/1991 | |
| DE | 102006012821 A1 | * | 9/2007 | |
| DE | 102004025492 A1 | * | 8/2009 | |
| GB | 1283481 | | 7/1972 | |
| GB | 1283481 A | | 7/1972 | |
| JP | 2000043147 A | * | 2/2000 | |

OTHER PUBLICATIONS

Induktionsschweissen, http://www.linguee.com/german-english/translation/induktionsschweissen.html.*
Induction Heating, Wikipedia, http://en.wikipedia.org/wiki/Induction_heating.*

* cited by examiner

*Primary Examiner* — Henry Yuen
*Assistant Examiner* — Brett Spurlock (57) ABSTRACT

The present invention provides a method and device for inductively heating a first and second surface to form a closure assembly. A method contemplated by the present invention includes spacing an upper die from a lower die for receipt of the first surface and the second surface configured in an overlying orientation, securing one end of the first surface to an end of the second surface and compressing the first surface toward the second surface to form a compressed arrangement which is inductively heated into a closure assembly.

13 Claims, 7 Drawing Sheets

INDUCTION WELD ASSEMBLY OF CLOSURE PANELS

FIELD OF THE INVENTION

This invention relates to a welding assembly and a method for welding a plurality of panels. More specifically, the present invention relates to an induction welding assembly and method for induction welding closure panels related to automobiles.

BACKGROUND OF THE INVENTION

Automobile manufacturing utilizes multiple techniques for joining together multiple surfaces having relatively large cross sectional areas. In some instances, these surfaces have varying cross-sections or may be fabricated using materials of different thicknesses or shapes.

Some methods of joining these surfaces may utilize mechanical fasteners. However, mechanical fasteners may generate concerns over time allowing the surfaces to become disjoined. Another method of joining surfaces include welding using resistance, laser, plasma or seam welding techniques. In a typical welding application, plural surfaces are overlapped and mechanically fixed in place using clamps for example. A heat source, such as an electrode is placed near the overlapped surface and approaches the overlapped surfaces. As the heat source is position near the overlapped surfaces, the temperature of the region affected by the heat source quickly raises generally forming a liquid. The heat source then progresses along the overlapped surface until the desired weld is achieved. Upon completion of the weld, the heat source is removed from the surface, which is then cooled. In this way a weld joint may be created for joining two or more surfaces together. The traditional welding heat source presents several disadvantages including safety concerns related to the excess heat and inconsistent and incomplete welds. It would be beneficial, therefore, to provide an induction device, generating a thermal effect on the joined surfaces within a narrow zone to avoid any excess heat or unsafe working environments.

However, traditional welding techniques provide for irregular points of stress and require excess after-welding preparation to remove any unwanted edges or surfaces. Some welding techniques may not extend along the perimeter of the joined surfaces allowing for undesired Rat Holes. Others use a flanging or hemming operation to join the surface perimeters but allow for variations in the perimeter surfaces. However, these operations may require excess material which require additional time and resources for removal. Also, some welding techniques simply are too impractical or expensive for a manufacturing process which requires consistent movement along the manufacturing line.

Some of the aforementioned welding techniques may provide for one or more of the following problems like, "Rat Holes" or filiform corrosion due to the migration of water to the inner radius of a hemmed surface. Additionally, using the overlapping or seam welding process may allow for a hem flange which may require additional time and resources for removing any unwanted hems or seams. Some processes utilize an adhesive or temporary weld to temporarily secure the welded surfaces prior to being welding or during shipping and assembly operations. As a result of using the adhesive, a curing process may be necessary after the welding is accomplished and after which a sealant may be required. Using a temporary weld may further contribute to any delays or excess costs. These problems and excessive operations may contribute to delays and increased costs during the manufacturing process.

In addition to the concerns previously identified, the flanging, adhesive bonding and the hemming processes traditionally employed in the automobile manufacturing process may further present packaging limitations, which may be required to allow for an area to apply the adhesive, an area to hem the flange or an area to apply the hold-down fixture of the hemmer. It may be beneficial to remove the excess material, if an alternative welding process were utilized. Additionally, by removing any excess material an enhanced package design may be utilized for transporting the joined surfaces providing additional benefits. Utilizing an alternative welding process may also allow for improved stiffness and rigidity of the welded surface and allow for flanges having shorter dimensions.

Finally, by allowing for an improved welding process which provides for the joining of surfaces along a perimeter, the finished product may have improved characteristics through sharper radii such as reduced dimensional variation and enhanced design freedom. In addition, as previously described, utilizing an alternative welding process may render several manufacturing operations unnecessary, including the die flanging operation, the hemming operation, the application of hem adhesive, the need for after-hem sealer, induction curing of the hem adhesive and in-process welds for temporarily securing surfaces during transfer from the assembly process to the finishing processes.

It therefore would be beneficial to provide a superior quality, high productivity and economical welding apparatus which provides at least some of the aforementioned advantages, whereby materials with different thickness and/or different surfaces may be welded while shaping the joined surfaces.

SUMMARY OF THE INVENTION

The present invention reduces the difficulties and disadvantages of the prior art by providing a method and device for inductive welding a generally planar first surface to a generally planar second surface having sufficient cross section to form a closure assembly, the method including the steps of spacing an upper die from a lower die for receipt of the first surface and the second surface configured in an overlying orientation, securing an end of the first surface to an end of the second surface between said upper and lower dies, compressing the first surface toward the second surface at said upper die and said lower die to form an end-to-end compressed first and second surface arrangement and inductively heating said end-to-end compressed first and second surface arrangement to form the closure assembly. The present invention also includes an inductive welding device addressing the difficulties and disadvantages of the prior art comprising a first arm operably separated from a second arm, said first arm associated with an upper die and said second arm associated with a lower die, said upper die adapted for receiving a first surface and said lower die adapted for receiving a second surface, said first surface overlying said second surface and an induction coil associated with one of said upper and lower dies and adapted for inductively heating said received first and second surfaces forming a closure assembly.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1A:
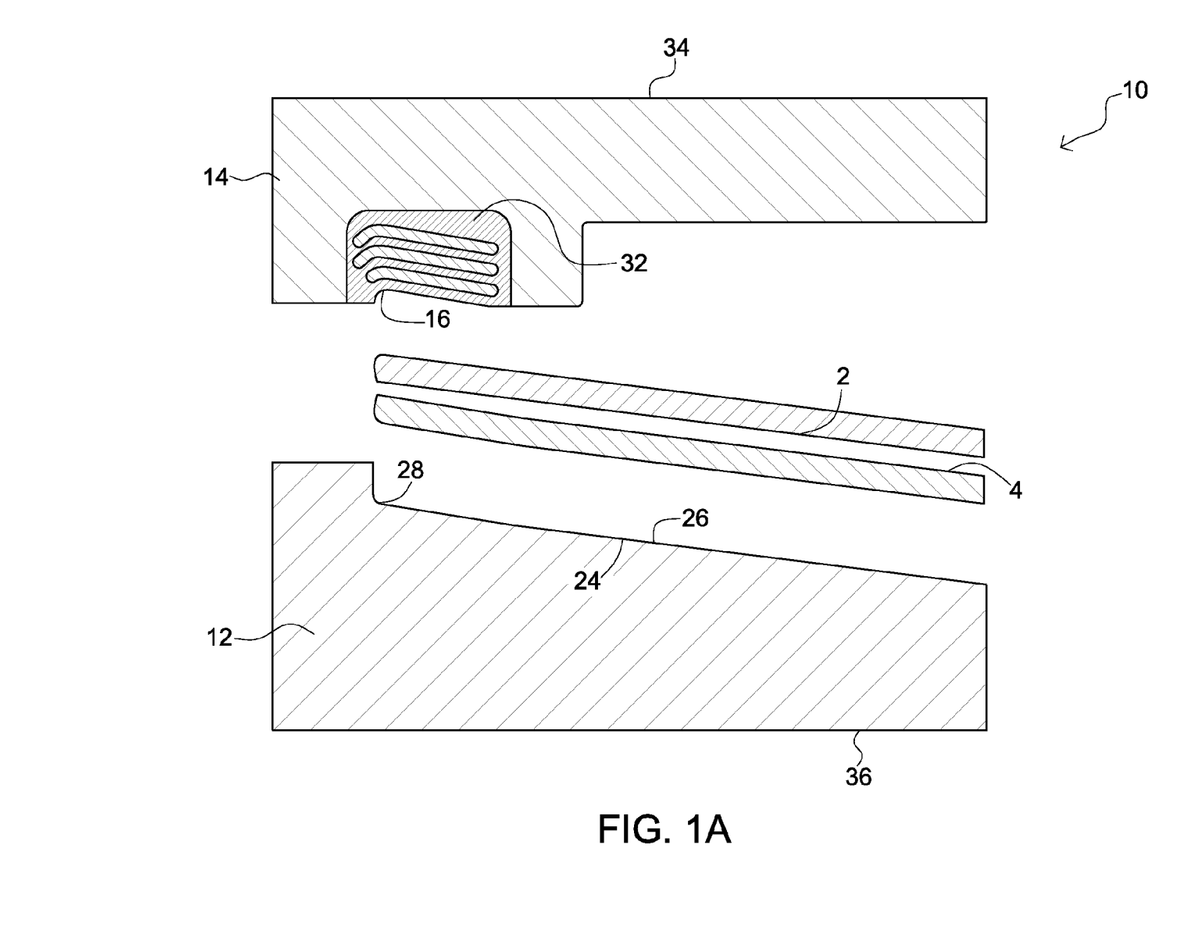
FIG. 1A is a semi-schematic perspective view illustrating an induction welding assembly.

In general, the present invention provides an induction welding device generally referred to herein by reference numeral 10, which is adapted for forming a closure assembly 20 from a first and second generally planar surfaces 2, 4 having a sufficient cross section to form the closure assembly 20. Generally, the induction welding device 10 includes a first arm 34 and a second arm 36, the first arm 34 being associated with an upper die 14 and the second arm 36 associated with a lower die 12. At least one induction coil 32 is also associated with at least one of the upper and lower dies 14, 12 and as illustrated in FIG. 1A is associated with the upper die 14. In addition, in practice one or both the first and second arms 34, 36 may be movable between a disengaged position to an engaged position with at least one of the upper and lower dies 14, 12 being in electromagnetic communication with the first and second surfaces 2, 4.

Although the upper and lower dies 14, 12 may be fabricated from a variety of materials, having a variety of configurations, in general a portion of the upper and lower dies 14, 12 associated with the induction coil is electrically insulated to sufficiently limit the passage of electrical current. The upper and lower dies 14, 12 are suitably positioned along a support member (not shown) for receiving the first and second surface 2, 4 which are to be joined. The first and second surfaces 2, 4 may include sheet metal body panels adapted for use in an automobile application, although other surfaces may be utilized by the present invention. In addition, first and second surfaces 2, 4 may be of varying dimensions, thicknesses or surfaces and placed within the induction welding device 10 at varying angles with respect to the upper and lower dies 14, 12. Generally, the first and second surfaces 2, 4 will have a dimension greater than the receiving surface of the upper and lower dies 14, 12, which may be greater than 12" inches. The receiving surface associated with the upper die 14 is illustrated in FIG. 1A as an arcuate receiver or laid-out flange 16. The receiving surface associated with the lower die 12 is illustrated in FIG. 1A as a passageway 26. Although, the illustrated first and second surfaces 2, 4 are generally greater than 12", the induction welding device 10 may be configured for use in joining smaller or equal dimensioned surfaces with the same or similar thicknesses or outer surface.

Figure 3:
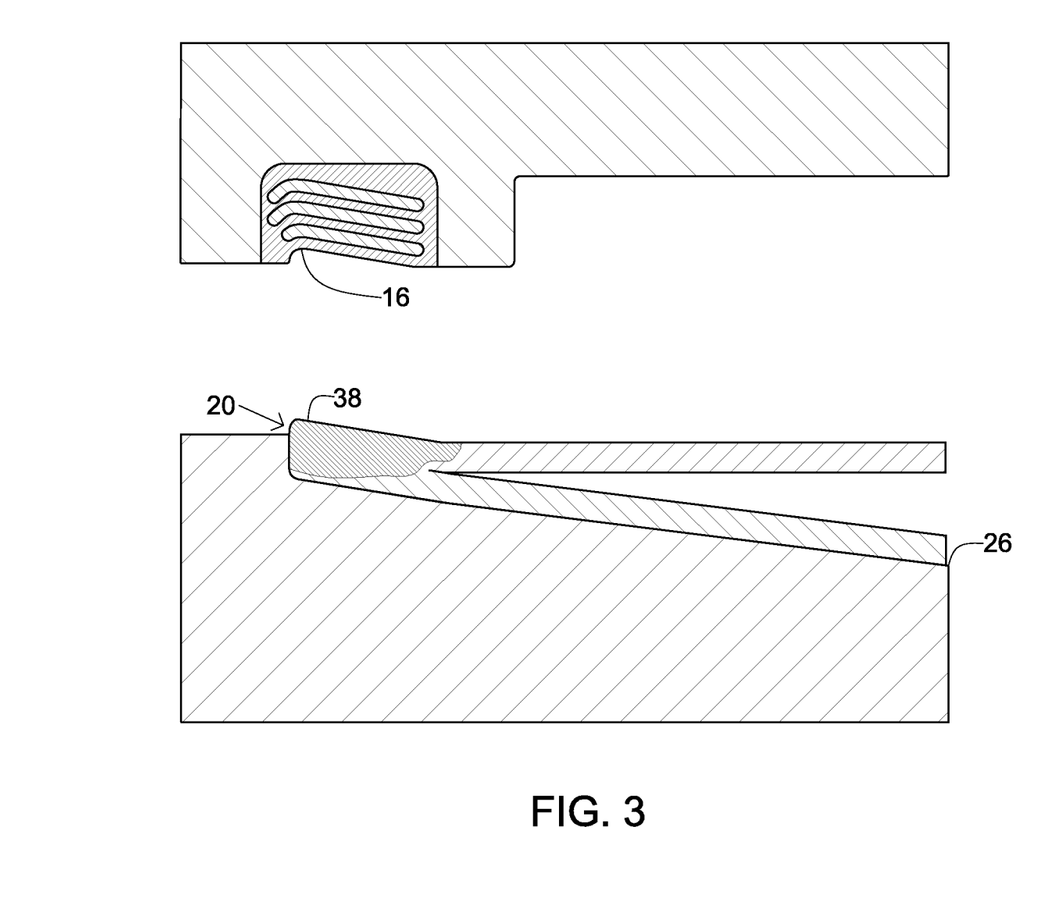
FIG. 3 is a semi-schematic perspective view of the induction welding assembly of FIG. 1A.

The upper and lower dies 14, 12 are generally affixed to the first and second arms 34, 36 associated with the induction welding device 10, however, removable dies may also be used in association with the induction welding device 10, the dies being replaceable as desired with alternatively configured die or die with alternative properties. The upper die receiver 16 and lower die receiver 26 respectively associated with the upper and lower dies 14, 12 are configured with a oppositely positioned shaping member which may or may not be complementary configured with respect to each other. Generally, both the arcuate receiver 16 and passageway 26 are arcuate and adapted for presenting a shaped end 38 illustrated in FIG. 3 of the closure assembly 20.

At least one of the first and second arms 34, 36 is moveable between the engaged and disengaged position, with the first and second arms 34, 36 being proximate to each other in the engaged position and separated a distance from each other in the disengaged position. Although, the distances between the first and second arms 34, 36 may vary, in general the first and second arms 34, 36 may vary between about 10 inches and about 36 inches apart during transition between the engaged and disengaged positions.

Figure 2:
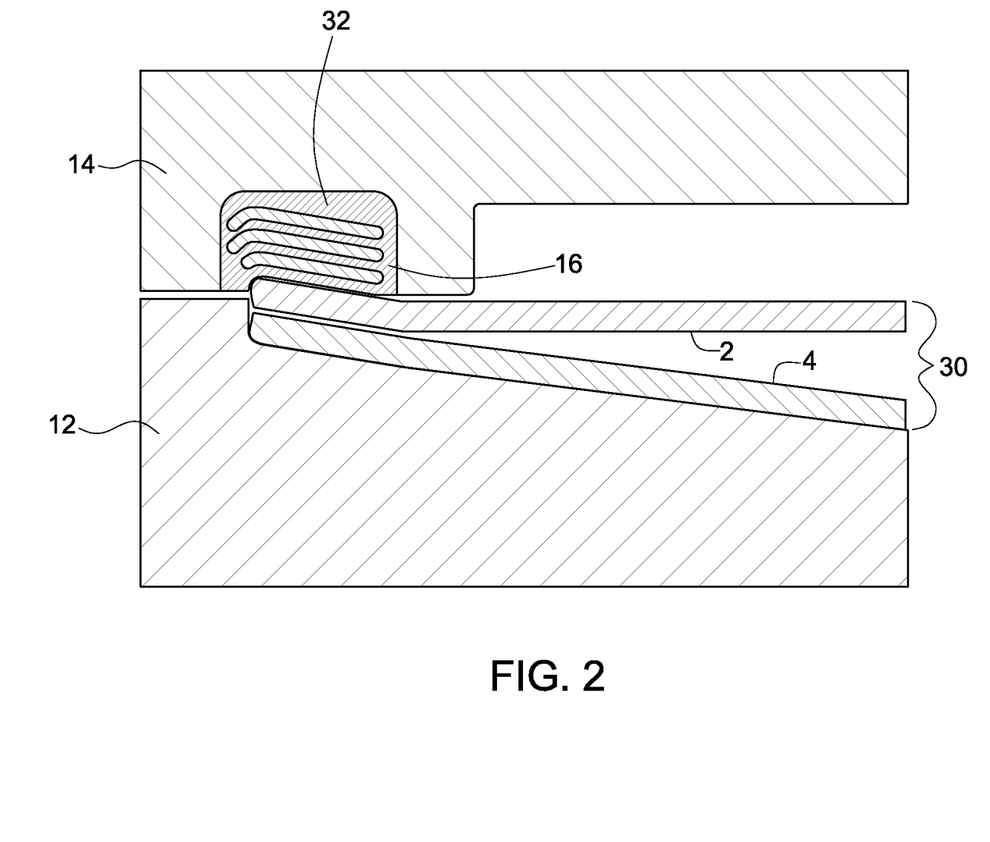
FIG. 2 is a semi-schematic perspective view of the induction welding assembly of FIG. 1A in receipt of a first and second surface.

As previously described and illustrated, the induction coil 32 is generally associated with the upper die 14 and as illustrated in FIG. 2 is positioned near the arcuate receiver 16 associated with the upper die 14. In operation, the induction coil 32 is positioned near the lower die 12 in the engaged position with the first and second surfaces 2, 4 positioned therebetween and the induction coil 32 is generally spaced a distance from the lower die 12 in the disengaged position.

During the welding process, the induction coil 32 is electro-magnetically energized to allow the coil 32 to provide for induction heating. Generally, a current is passed through the induction coil 32 with a high-frequency power supply causing it to generate a magnetic field. The magnetic field in turn may create an opposing magnetic field within the first and second surfaces 2, 4 and generally at the interface between the first and second surfaces 2, 4. The opposing magnetic fields may generate eddy currents within the first and second surfaces 2, 4 that may ultimately dissipate heat energy. The frequency of the power supply is sufficiently controlled to provide an accurate penetration depth in order to focus the heat energy created by the eddy currents to concentrate heat at this interface between the first and second surfaces 2, 4. Thereby presenting the heating source for welding the nearby first and second surfaces 2, 4. The induction coil 32 and the high-frequency magnetic field are electrically distinct from the upper die 14.

The induction coil 32 may be fabricated using copper or brass tubing which is water-cooled during operation to prevent overheating or melting of the coil 32. The coil 32 is generally mounted within an insulative material such as, but not limited to, a urethane material that provides rigidity and durability. These insulative materials are generally known in the industry and may vary accordingly. Design of the induction coil 32 may include "field shapers" for directing the magnetic field away from the induction coil 32 towards the first and second surfaces 2, 4. Optionally, a "flux" material may be applied to the contact surfaces between the first and second surfaces 2, 4, to promote welding of the closure assembly 20.

Figure 4:
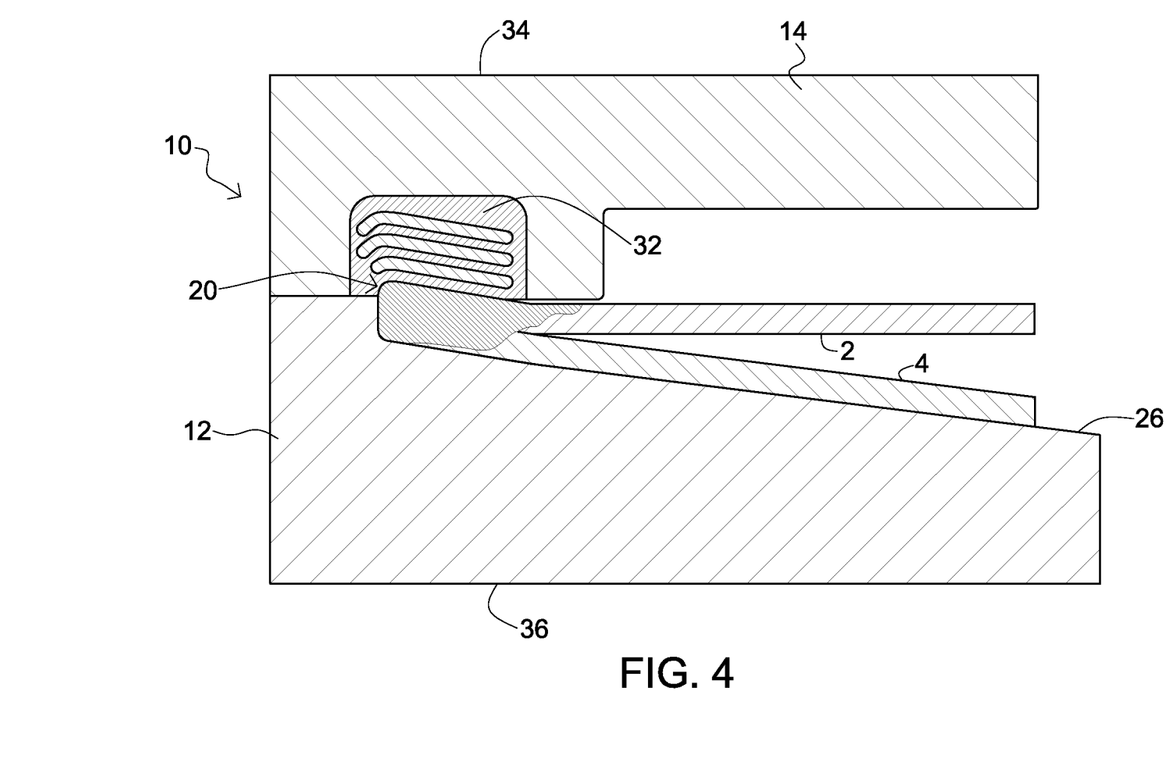
FIG. 4 is a semi-schematic perspective view of the induction welding assembly of FIG. 1A forming a closure assembly.

FIG. 4 illustrates the induction welding device 10 in the engaged position, the induction coil 32 being generally positioned adjacent to and above the received first and second surfaces 2, 4 which are arranged in an overlapping manner, with the end of the first surface 2 associated with an end of the second surfaces 4. Additionally, the passageway 26 associated with the lower die 12 may be angled to receive one of the first or second surfaces 2, 4 in an orientation rotated from or towards the upper die 14. Alternatively, the induction coil 32 may be associated with the lower die 12 or both the lower and upper dies 12, 14. The induction coil is illustrated in the process of welding first and second surfaces 2, 4.

Figure 5:
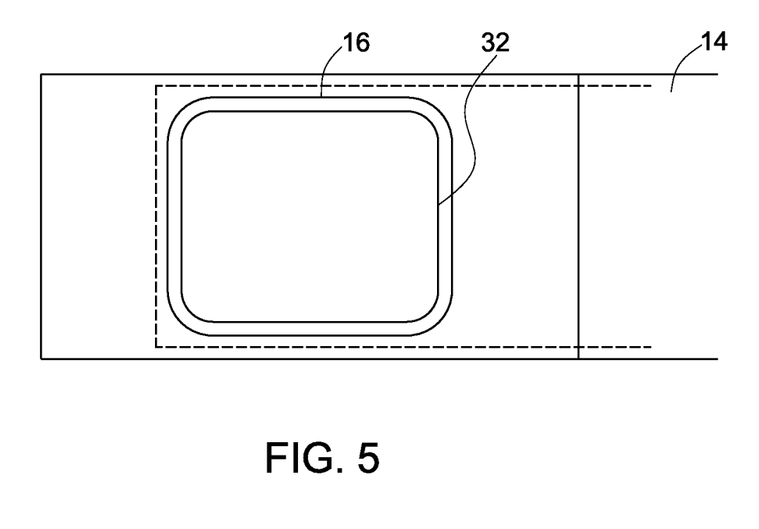
FIG. 5 is a semi-schematic perspective view of an upper die associated with the induction welding assembly of FIG. 1A.

The distance between the surface of the induction coil 32 and the nearby first and second surfaces 2, 4, is preferably minimal, because the induction welding efficiencies degenerates by the square of the distance separating the induction coil 32 from the first and second surfaces 2, 4. In practice the distance may range between a few tenths of inches and up to a few inches. As Illustrated in FIG. 5, within the upper die 14, the induction coil 32 is sized and shaped to surround the perimeter of the upper die 14 such that when the induction coil is activated 32, a weld is formed around the outer periphery of the joined surfaces. Power to the induction coil 32 may be regulated based upon the desired heating temperature for the particular welding application.

In operation, the upper die 14 is spaced from the lower die 12 and the first and second surfaces 2, 4 are secured in an end-to-end orientation with an end of the first surface 2 being secured to an end of the second surface 4. Optionally, the first and second surfaces 2, 4 may be angularly oriented. The first and second surfaces 2, 4 are generally positioned between the upper and lower dies 14, 12 according to the master gage datums. FIG. 2, illustrates the upper and lower dies 14, 12 in receipt of the first and second surfaces 2, 4 arranged in an overlying end-to-end orientation with the first surface 2 extending towards the arcuate receiver 16 and the second surface 4 extending along the passageway 26 towards the obliquely orientated lip 28. As the upper and lower dies 14, 12 transition from the disengaged position towards the engaged position, the first surface 2 is compressed towards the second surface 4 forming an overlying end-to-end compressed first and second surface arrangement 30 illustrated in FIG. 1B. Optionally, either the first, second or both dies 14, 12 may be configured with a specific orientation to present a closure assembly 20 having a desired shaped. If present, the arcuate receiver (also referred to as a laid-out flange) 16 may angularly receive one of the first and second surfaces 2, 4.

Figure 6:
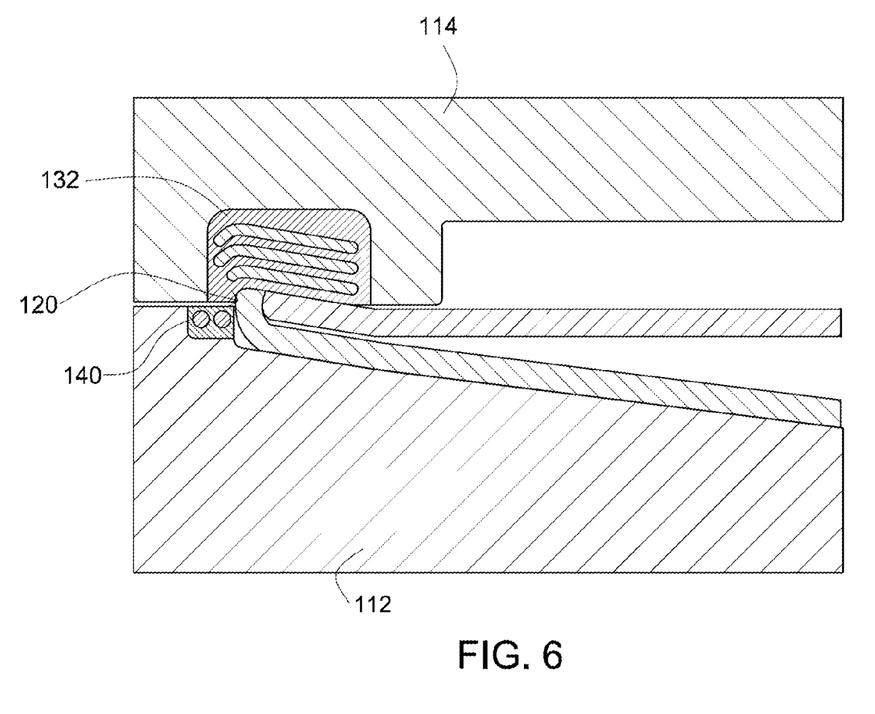
FIG. 6 is a semi-schematic perspective view of an alternative induction welding assembly in receipt of the first and second surfaces.

Optionally, the wall structure 24 and the obliquely orientated lip 28 associated with the lower die 12 may present a deforming region for shaping the closure assembly 20 so that it has the attractive surface edge 38. Additionally, the upper die 14 may have a complimentary configuration according to the deforming region. Alternatively, the deforming region may be associated with either or both the upper and/or lower die 14, 12. During the welding process previously described, the induction coil 32 in association with the deforming region may present the shaped surface edge 38 extending from the closure assembly 20. The deforming region may have a variety of configurations for shaping the closure assembly 20 including extending upwardly from the lower die 12 towards the upper die 14 presenting the aesthetically shaped end 38 with the second surface 4 adjacent to the first surface 2. In this manner an alternatively configured closure assembly 120 is illustrated in FIG. 6. This configuration may provide a variety of closure assembly 20 configurations depending on the desired shaped surface.

After receiving the first and second surface 2, 4, the induction coil 32, may be activated with the high-frequency magnetic field, electrically powered to allow the induction coil 32 to heat. While the induction coil 32 may have a variety of configurations and orientations, generally, the induction coil 32 illustrated in FIG. 5 is orientated along the perimeter of the upper die 14 to provide for an induction weld along at least a portion of the first and second surface 2, 4.

As the induction coil 32 heats, the temperature of the upper and lower surfaces 2, 4 raises. Once the upper and lower surfaces 2, 4 reach the desired temperature, the induction welding device 10 may transition towards the engaged position with the upper die 14 directed towards the lower die 12, the first and second surfaces 2, 4, positioned therebetween in the end-to-end arrangement. Upon contact with the first and/or second surfaces 2, 4, the upper die 14 may press the first and second surfaces 2, 4 together with sufficient force to allow for intimate contact between the upper and lower dies 14, 12 to form the end-to-end compressed first and second surface arrangement 30.

As best illustrated in FIG. 4, with sufficient time and heat, the upper and lower dies 14, 12 may present a weld connection along the perimeter of the end-to-end compressed first and second surface arrangement 30, forming the closure assembly 20. The induction coil 32 may be raised or lowered onto the first and second surfaces 2, 4 by moving the first, second or both arms 34, 36 connected to the movable upper and/or lower die 14, 12. The first, second or both arms' 34, 36 movement may be controlled mechanically, hydraulically or electrically depending on the desired operation.

The induction coil 32 may be fabricated from a number of materials, including, as previously indicated, copper or brass tubing that is water cooled. Although, the first and second surfaces 2, 4 are illustrated in the end-to-end configuration, other configurations are possible for use with the induction welding device 10.

Optionally, as illustrated in FIG. 6, a liquid may be circulated through a tube 140 associated with a lower die 112 and/or an upper die 114 to help cool the upper and lower dies 114, 112 and ensure that any heat transferred during the energizing of an induction coil 132 will not negatively impact the surface quality of the welded closure assembly 120. In addition, fabricating portions of support members associated with the inductive weld assembly 110 from non-conductive materials, including non-magnetic material may prevent further overheating.

Figure 1B:
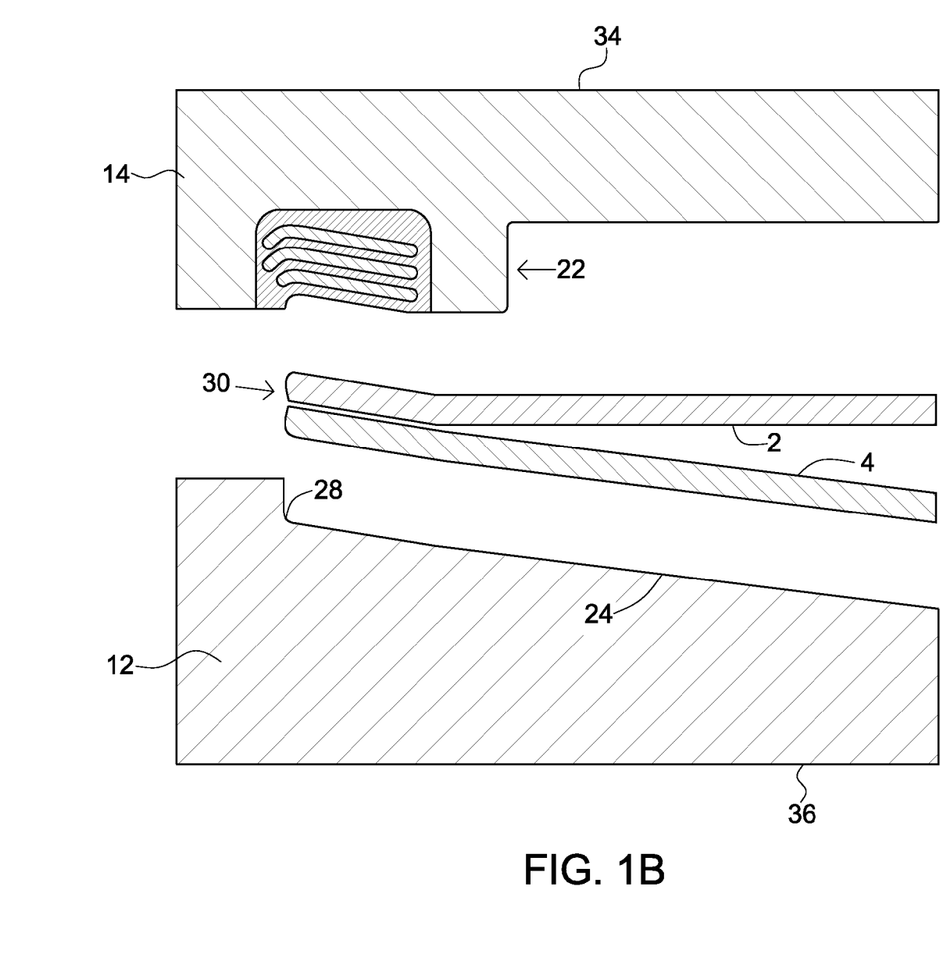
FIG. 1B is a semi-schematic perspective view illustrating an inducting welding assembly of FIG. 1A in receipt of the end-to-end first and second surface arrangement.

Generally, as illustrated in FIG. 1B, the first and second arms 34, 36 associated with the upper and lower dies 14, 12 and associated upper and lower dies 14, 12 are illustrated with a generally planar configuration. The upper die 14 generally has a boss region 22 presenting the arcuate receiver 16 which is generally adapted for receiving the first surface 2 while preventing unwanted movement as the upper and lower die 14, 12 move towards each other. The lower die 12 has a wall structure 24 presenting the passageway 26 with the obliquely oriented lip 28 extending upwardly therefrom into the passageway 26. In the illustrated configuration, the obliquely oriented lip 28 is generally adapted to receive the second surface 4, preventing unwanted movement of the first and second surfaces 2, 4 while allowing for an angular orientation of the second surface 4 with respect to the first surface 2. Alternatively, the upper and lower dies 14, 12 may be configured using a variety of shapes including regular and irregular shapes for joining the first and second surfaces 2, 4 to inductively heat and form the closure assembly 20. The lower die 12, being adapted to receive the second surface 4 may further be configured to present a shaped weld associated with the closure assembly 20 such as, but not limited to, a jewel-effect which may be presented by configuring the lower die 12 with a small radius of around 1.5 mm.

While the invention has been described with respect to specific examples including presently preferred modes of carrying out the invention, those skilled in the art will appre-

Having thus described the invention, what is claimed as new and desired to be secured by Letters Patent is as follows:

1. A method for joining a generally planar first surface, having a sufficient cross section along at least a portion of a periphery of the first surface, to a generally planar second surface, having a similarly sufficient cross section along at least a portion of a periphery of the second surface, to form a closure assembly, the method including the steps of:
    spacing an upper die from a lower die for receipt of the first surface, made of metal, and the second surface, made of metal, configured in an overlying orientation that aligns the portion of the periphery of the first surface with the portion of the periphery of the second surface, the portions of the peripheries of the first and second surfaces to be induction welded together,
    providing an obliquely oriented lip on at least one of the upper die and the lower die,
    securing the portion of the periphery of the first surface to the portion of the periphery of the second surface between said upper and lower dies, the portion of the second periphery to be induction welded located to abut the lip,
    compressing the first surface towards the second surface at said upper die and said lower die at the portions of the peripheries of the first and second surfaces to be induction welded to form an end-to-end compressed first and second surface arrangement,
    inductively heating the portions of the peripheries of the first and second surfaces forming said end-to-end compressed first and second surface arrangement to form the closure assembly by induction welding, and
    during the step of inductively heating, shaping the portion of at least the second periphery with the lip providing cooling coils in the obliquely oriented lip adjacent to the portion of the periphery of the second surface within which the portion of the periphery of the first surface is nested.

2. The method of claim 1 wherein the step of securing further comprises the step of transitioning the upper die towards the lower die.

3. The method of claim 1 wherein said upper die is associated with a first arm and the lower die is associated with a second arm, said first arm and said second arms being movable between a disengaged position to an engaged position with at least one of the upper and lower dies being in electromagnetic communication with the first and second arms.

4. The method of claim 1 wherein a wall structure presents a substantially planar passageway between said lower die and said upper die.

5. The method of claim 1 wherein said upper die further includes a boss region extending towards said lower die, the boss region causing the upper die to contact the first surface adjacent to the portion of the periphery of the first surface to be welded.

6. The method of claim 5 wherein said boss region presents an arcuate receiver adapted to receive the first surface whereby said first surface extends towards said arcuate receiver.

7. The method of claim 1 further comprising the step of angularly positioning the first surface with respect to the second surface.

8. The method of claim 1 further comprising the step of cooling one of said upper and lower dies to prevent overheating.

9. A method for joining a generally planar first surface, having a sufficient cross section along at least a portion of a periphery of the first surface, to a generally planar second surface, having a similarly sufficient cross section along at least a portion of a periphery of the second surface with the periphery of the second surface having a curved portion that abuts an end of the periphery of the first surface, to form a closure assembly, the method including the steps of:
    spacing an upper die from a lower die for receipt of the first surface and the second surface configured in an overlying orientation that nests the portion of the periphery of the first surface within the curved portion of the periphery of the second surface, the portions of the peripheries of the first and second surfaces to be welded together,
    providing an obliquely oriented lip on at least one of the upper die and the lower die,
    securing the portion of the periphery of the first surface to the portion of the periphery of the second surface between said upper and lower dies, the curved portion of the second periphery to be welded located to abut the lip,
    compressing the first surface towards the second surface at said upper die and said lower die at the portions of the peripheries of the first and second surfaces to form a compressed first and second surface arrangement,
    inductively heating the portions of the peripheries of the first and second surfaces to form the closure assembly by induction welding, and
    during the step of inductively heating, shaping at least the curved portion of at least the second periphery with the lip providing cooling coils in the obliquely oriented lip adjacent to the portion of the periphery of the second surface within which the portion of the periphery of the first surface is nested.

10. The method of claim 1 wherein the step of providing an obliquely oriented lip includes providing the obliquely oriented lip on the lower die and providing a second obliquely oriented lip on the upper die that is aligned with the obliquely oriented lip; and the step of shaping including shaping the portions of the first and second periphery with the lips to form a portion of the periphery of the closure at the induction welding location.

11. The method of claim 10 wherein the second obliquely oriented lip is provided by an induction coil.

12. The method of claim 9 including providing cooling coils in the obliquely oriented lip adjacent to the portion of the periphery of the second surface within which the portion of the periphery of the first surface is nested.

13. A method for joining a generally planar first surface, having a sufficient cross section along at least a portion of a periphery of the first surface, to a generally planar second surface, having a similarly sufficient cross section along at least a portion of a periphery of the second surface with the periphery of the second surface having a curved portion that abuts an end of the periphery of the first surface, to form a closure assembly, the method including the steps of:
    spacing an upper die from a lower die for receipt of the first surface and the second surface configured in an overlying orientation that nests the portion of the periphery of the first surface within the curved portion of the periphery of the second surface, the portions of the peripheries of the first and second surfaces to be induction welded together,
    providing an obliquely oriented lip on at least one of the upper die and the lower die, securing the portion of the periphery of the first surface to the portion of the periphery of the second surface between said upper and lower dies, the curved portion of the second periphery to be induction welded located to abut the lip, compressing the first surface towards the second surface at said upper die and said lower die at the portions of the peripheries of the first and second surfaces to form a compressed first and second surface arrangement, inductively heating the portions of the peripheries of the first and second surfaces to form the closure assembly by induction welding, during the step of inductively heating, shaping at least the curved portion of at least the second periphery with the lip; and providing cooling coils in the obliquely oriented lip adjacent to the portion of the periphery of the second surface within which the portion of the periphery of the first surface is nested.

* * * * *